No. 823,398. PATENTED JUNE 12, 1906.
S. S. CUDD.
COMBINED FERTILIZER DISTRIBUTER AND CULTIVATOR.
APPLICATION FILED APR. 17, 1906.
2 SHEETS—SHEET 2.
Fig. 4.
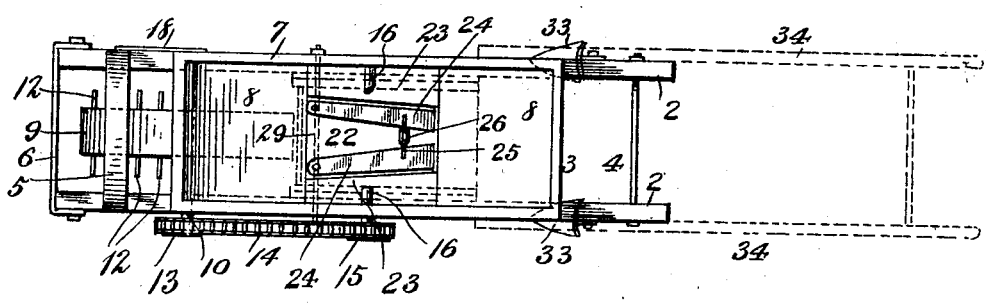
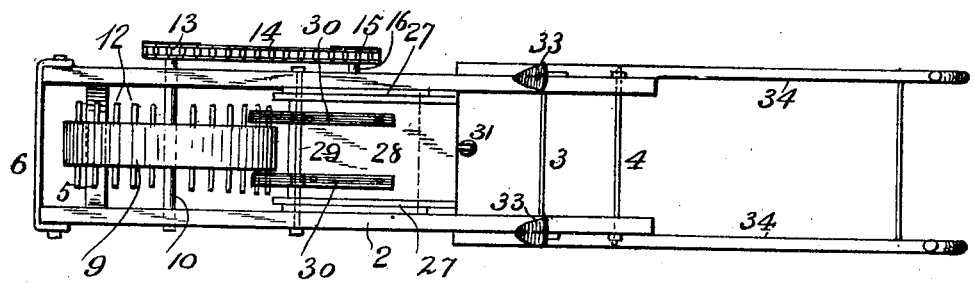
Fig. 5.
Witnesses
F. L. Durand
C. H. Griesbauer
Inventor
Simeon Scove Cudd
By A. B. Willson & Co
Attorneys

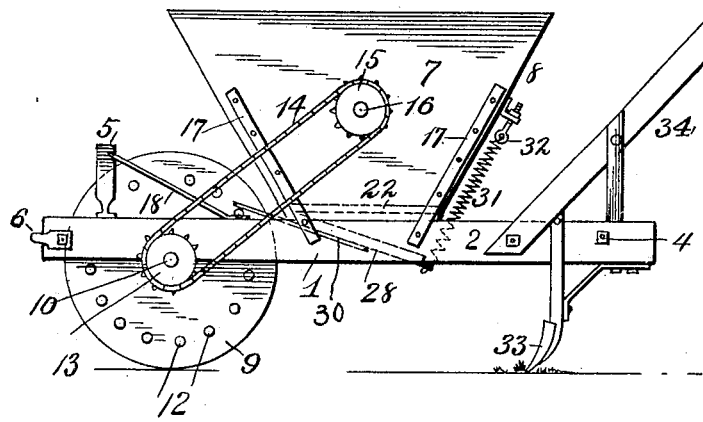
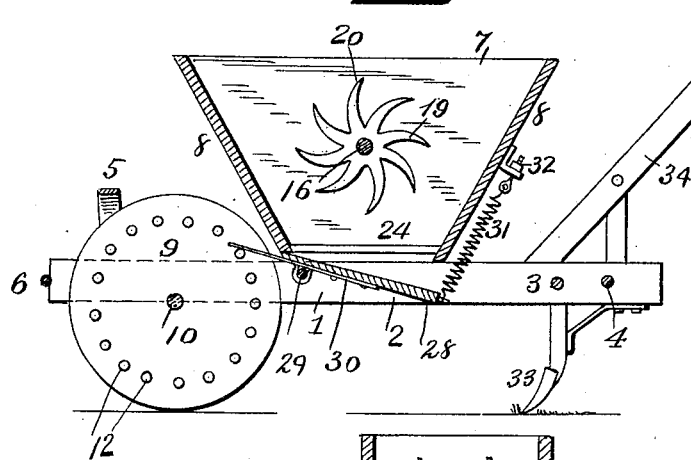
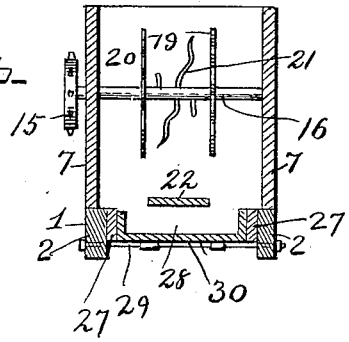

UNITED STATES PATENT OFFICE.

SIMEON SCOVE CUDD, OF ELZIE, SOUTH CAROLINA.

COMBINED FERTILIZER-DISTRIBUTER AND CULTIVATOR.

No. 823,398.        Specification of Letters Patent.        Patented June 12, 1906.

Application filed April 17, 1906. Serial No. 312,154.

*To all whom it may concern:*

Be it known that I, SIMEON SCOVE CUDD, a citizen of the United States, residing at Elzie, in the county of Union and State of South Carolina, have invented certain new and useful Improvements in a Combined Fertilizer-Distributer and Cultivator; and I do declare the following to be a full, clear, and exact description of the invention, such as will enable others skilled in the art to which it appertains to make and use the same.

This invention relates to improvements in combined fertilizer-distributers and cultivators.

The object of the invention is to provide a fertilizer-distributer and cultivator having means whereby the contents of the hopper on the machine will be evenly and regularly distributed and means whereby the feed-passages of the hopper will be prevented from becoming clogged or stopped up.

A further object is to provide a machine of this character having means whereby the size of the feed-opening of the hopper may be regulated and means whereby the distributing mechanism of the hopper may be controlled.

With the above and other objects in view the invention consists of certain novel features of construction, combination, and arrangement of parts, as will be hereinafter described and claimed.

In the accompanying drawings, Figure 1 is a side view of the combined fertilizer-distributer and cultivator constructed in accordance with the invention. Fig. 2 is a vertical longitudinal sectional view of the same. Fig. 3 is a cross-sectional view through the hopper. Fig. 4 is a plan view of the machine, and Fig. 5 is an inverted plan view of the same.

Referring more particularly to the drawings, 1 denotes the supporting-frame of the machine, said frame consisting of longitudinally-disposed side bars 2, which are connected together by cross-bars 3 and by rods 4 at their rear ends and by a yoke 5 and a clevis-bar 6 at their forward ends. Supported upon the side bars 3 is a hopper 7, said hopper being provided with inclined ends 8, as shown.

Journaled between the side bars 2 at the forward end of the machine is a tappet-wheel 9, said wheel being mounted upon an axle 10 and provided on each side with an annular series of tappet-pins 12. On one end of the shaft 10 is secured a sprocket-wheel 13, which is connected by sprocket-chains 14 to a sprocket-wheel 15, mounted on the projecting end of an agitator-shaft 16, journaled in the sides of the hopper, as shown. The hopper 7 is secured to the side bars 2 by means of brace rods or bars 17. The yoke 5 is securely braced to the bars 2 by inclined brace-rods 18. On the shaft 16 within the hopper 7 is mounted a pair of agitator-wheels 19, which consists of a series of radially-disposed curved blades 20, which are adapted to force the contents of the hopper through the feed-openings in the bottom of the same. On the shaft 16 between the wheels 19 is secured a series of radially-projecting irregular stirring rods or bars 21, which serve to keep the contents of the hopper in motion and prevent the clogging of the same.

In the bottom of the hopper 7 is arranged a central longitudinally-disposed bottom board 22, (see Fig. 4,) the side edges of which taper from the forward end of the hopper toward the rear end thereof, as shown, thereby forming between said edges of the board and the adjacent sides of the hopper feed-openings 23. Pivotally mounted at one end to the forward end of the board 22 are feed-plates 24, said plates being connected together near their opposite or rear ends by means of adjusting-rods 25, which are adjustably connected by a bolt and butterfly-nut 26. The feed-plates 24 taper from their connected ends toward their pivoted ends, as shown. By actuating the bolt and butterfly-nut 26 the positions of the plates may be regulated to cover up more or less of the feed-opening 23, thereby regulating the feed of the fertilizer from the hopper.

Secured to the inner sides of the bars 2 of the supporting-frame within the hopper are guide-strips 27, between which is adapted to work a distributing-tray 28. Said tray is pivotally mounted near its forward end beneath the feed-openings 23 upon a transversely-disposed tie-rod 29, the ends of which pass through and are secured in the side bars of the frame, as shown. Secured to the under side of the tray 28 and forming the hinges thereof are longitudinally-disposed trip-bars 30, the outer ends of which project forward beyond the end of the hopper and in the path of movement of the tappet-pins 12 on the wheel 9, whereby when the wheel is turned the vibratory movement will be imparted to the distributing-tray, which will cause the same to uniformly distribute or discharge the fertilizer falling thereon from the hopper into the furrow. The rear end of the distributing-tray 28 is supported by means of a coil-spring 31, the upper end of which is connected to an adjusting-bolt 32, by means of which the tension of the spring may be regulated to permit the frame 29 to be more or less freely vibrated by the tappet-wheel.

Connected to the rear end of the side bars 2 are cultivator-blades 33, which are adapted to work the ground and to cover the fertilizer as the same is distributed from the hopper. The rear end of the side bars 2 are provided with handles 34, whereby the machine may be guided and controlled.

A fertilizer-distributer constructed as herein shown and described will be light, strong, and durable and may be conveniently used in working on hilly or stumpy ground and is adapted to be drawn by a single horse, which may be attached to the machine at the clevis-bar 6 or to the yoke 5, as may be desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a combined fertilizer-distributer and cultivator, the combination with a supporting-frame, of a hopper arranged thereon, feed-openings formed in the bottom of said hopper, feed-plates, means to adjust said feed-plates to regulate the size of said feed-opening, a distributing-tray pivotally mounted at its forward end below said feed-opening, a spring to support the rear end of said distributing-tray, means to regulate the tension of said spring, trip-arms secured to the forward end of said tray, a tappet-wheel journaled in the supporting-frame of the machine, tappets arranged on said wheel to engage said trip-arms and thereby vibrate said distributing-tray, and means to agitate and force the fertilizer through the feed-opening in the hopper and onto said tray, substantially as described.

2. In a combined fertilizer-distributer and cultivator, the combination with a supporting-frame, of a hopper arranged thereon, feed-openings formed in the bottom of and adjacent to each side of said hopper, feed-plates pivotally mounted at their forward ends on said hopper-bottom, means to adjustably connect the opposite ends of said plates together, whereby the latter may be adjusted to regulate the size of said feed-openings, a distributing-tray pivotally mounted within said feed-opening, trip-arms secured to said tray and projecting forwardly from the same, a spring connected to the rear end of said tray, means to regulate the tension of said spring, a tappet-wheel journaled in the supporting-frame of the machine, tappet-pins arranged on said wheel to engage the trip-arms on said tray and thereby vibrate the same against the tension of said spring, agitating-wheels journaled in said hopper to force the fertilizer through said feed-openings, stirring-arms arranged on the shaft of said wheels, and means to drive said agitating-wheels and stirring-arms, substantially as described.

3. In a combined fertilizer-distributer and cultivator, the combination with a supporting-frame, of a hopper arranged thereon, feed-openings formed in the bottom of and adjacent to each side of said hopper, feed-plates pivotally mounted at their forward ends on said hopper-bottom, means to adjustably connect the opposite ends of said plates together, whereby the latter may be adjusted to regulate the size of said feed-openings, a distributing-tray pivotally mounted within said feed-opening, trip-arms secured to said tray and projecting forwardly from the same, a spring connected to the rear end of said tray, means to regulate the tension of said spring, a tappet-wheel journaled in the supporting-frame of the machine, tappet-pins arranged on said wheel to engage the trip-arms on said tray and thereby vibrate the same against the tension of said spring, agitating-wheels journaled in said hopper to force the fertilizer through said feed-openings, stirring-arms arranged on the shaft of said wheels, a sprocket-wheel fixed on the projecting end of the shaft of said distributing-wheel, a sprocket-wheel fixed on the shaft of said tappet-wheel, a sprocket-chain connecting said sprocket-wheel, a draft-yoke and a clevis-bar arranged on and connected to the side bars of said supporting-frame at their forward ends, cultivator-blades secured to the rear ends of said side bars, and handles secured to said bars and projecting rearwardly from the machine, substantially as described.

In testimony whereof I have hereunto set my hand in presence of two subscribing witnesses.

SIMEON SCOVE CUDD.

Witnesses:
J. R. HIX,
J. W. GUGARY.